United States Patent
Steinberg et al.

(10) Patent No.: US 11,946,499 B2
(45) Date of Patent: Apr. 2, 2024

(54) EXPANSION ANCHOR WITH SLEEVE ABUTMENT WALLS

(71) Applicant: Hilti Aktiengesellschaft, Schaan (LI)

(72) Inventors: Tanja Steinberg, Buchs (CH); Hideki Shimahara, Grabs (CH); Yijun Li, Buchs (CH); Matteo Spampatti, Addison, TX (US); Christian Wachter, Buers (CH); Guenter Domani, Weissenberg (DE); James Ary, Denton, TX (US)

(73) Assignee: Hilti Aktiengesellschaft, Schaan (LI)

( * ) Notice: Subject to any disclaimer, the term of this patent is extended or adjusted under 35 U.S.C. 154(b) by 775 days.

(21) Appl. No.: 16/650,770

(22) PCT Filed: Oct. 17, 2018

(86) PCT No.: PCT/EP2018/078401
§ 371 (c)(1),
(2) Date: Mar. 25, 2020

(87) PCT Pub. No.: WO2019/081300
PCT Pub. Date: May 2, 2019

(65) Prior Publication Data
US 2020/0224695 A1  Jul. 16, 2020

(30) Foreign Application Priority Data
Oct. 25, 2017  (EP) .................................... 17198246

(51) Int. Cl.
*F16B 13/06* (2006.01)

(52) U.S. Cl.
CPC .................................. *F16B 13/065* (2013.01)

(58) Field of Classification Search
CPC ............................... F16B 13/065; F16B 13/04
See application file for complete search history.

(56) References Cited

U.S. PATENT DOCUMENTS

| 4,287,807 A | 9/1981 | Pacharis et al. |
| 5,211,512 A | 5/1993 | Frischmann et al. |
| 5,314,277 A * | 5/1994 | Fischer ................. F16B 13/063 411/55 |

(Continued)

FOREIGN PATENT DOCUMENTS

| CH | 591637 A5 | 9/1977 |
| CN | 101235658 A | 8/2008 |

(Continued)

OTHER PUBLICATIONS

International Search Report of PCT/EP2018/078401, dated Jan. 29, 2019.

*Primary Examiner* — Amy J. Sterling
(74) *Attorney, Agent, or Firm* — Davidson, Davidson & Kappel, LLC

(57) ABSTRACT

An expansion anchor having an anchor bolt, an expansion sleeve surrounding the anchor bolt, and an expansion body located in a front region of the anchor bolt, wherein the expansion body has a converging zone for expanding the expansion sleeve. The expansion body has at least one expansion sleeve abutment wall facing the expansion sleeve. The invention also relates to a method for using such an expansion anchor.

61 Claims, 3 Drawing Sheets

(56) References Cited

U.S. PATENT DOCUMENTS

| | | | |
|---|---|---|---|
| 7,959,379 B2* | 6/2011 | Robertson, Jr. | F16B 13/066 |
| | | | 405/259.4 |
| 8,974,162 B2* | 3/2015 | Shimahara | F16B 13/065 |
| | | | 411/51 |
| 9,133,871 B2 | 9/2015 | Schaeffer et al. | |
| 9,869,334 B2 | 1/2018 | Gstach et al. | |
| 10,962,038 B2* | 3/2021 | Steinberg | F16B 13/066 |
| 2001/0010787 A1* | 8/2001 | Hsu | F16B 13/065 |
| | | | 411/61 |
| 2008/0008560 A1 | 1/2008 | Hirotatsu et al. | |
| 2010/0322738 A1 | 12/2010 | Lau et al. | |
| 2011/0081217 A1 | 4/2011 | Wissling et al. | |
| 2012/0251262 A1* | 10/2012 | Hidalgo Salgado | |
| | | | E21D 21/0033 |
| | | | 411/15 |
| 2012/0311947 A1* | 12/2012 | Van Wissen | F16B 13/066 |
| | | | 52/250 |
| 2014/0037388 A1* | 2/2014 | Ahola | E02D 5/805 |
| | | | 405/259.5 |
| 2014/0072384 A1 | 3/2014 | Wissling | |
| 2014/0133933 A1 | 5/2014 | Shimahara et al. | |
| 2016/0238052 A1 | 8/2016 | Schaeffer | |
| 2016/0312812 A1 | 10/2016 | Dijkhuis et al. | |

FOREIGN PATENT DOCUMENTS

| | | |
|---|---|---|
| CN | 101463854 A | 6/2009 |
| CN | 102052373 A | 5/2011 |
| CN | 102182737 A | 9/2011 |
| CN | 202756368 U | 2/2013 |
| CN | 103429913 A | 12/2013 |
| CN | 206257132 U | 6/2017 |
| DE | 2256822 A1 | 6/1974 |
| DE | 27 44666 A1 | 4/1979 |
| DE | 3411285 A1 | 10/1985 |
| EP | 0515916 A2 | 12/1992 |
| EP | 2309138 A2 | 4/2011 |
| EP | 2514979 A1 | 10/2012 |
| EP | 2848825 A1 | 3/2015 |
| JP | 2007239804 A | 9/2007 |
| JP | 2016217392 A | 12/2016 |
| KR | 20130084223 A | 7/2013 |
| RU | 2632283 C1 | 10/2017 |
| WO | WO12126700 A1 | 9/2012 |
| WO | WO15067578 A1 | 5/2015 |

\* cited by examiner

EXPANSION ANCHOR WITH SLEEVE ABUTMENT WALLS

The invention relates to an expansion anchor. Such an anchor is provided with an anchor bolt, an expansion sleeve surrounding the anchor bolt, and an expansion body located in a front region of the anchor bolt, wherein the expansion body has a converging zone for expanding the expansion sleeve.

BACKGROUND

WO 15067578 A1 describes an expansion anchor having grooves that are closed with respect to the front end of the anchor disposed in the expansion body, wherein the grooves reduce a contact surface between the expansion sleeve and the oblique surface of the expansion body. In particular, the individual grooves are relatively narrow to avoid the expansion sleeve being bent into the grooves when the expansion sleeve is expanded.

EP2848825 A1 discloses an expansion anchor in which the expansion sleeve has at least one web on its inner side, which web engages a groove in the anchor bolt. During installation, this web is displaced radially outwardly by the expansion body of the bolt.

EP2514979 A1 shows an anchor bolt with an eccentric region that widens the expansion sleeve upon rotation of the anchor bolt.

EP2309138 A2 shows an expansion body having longitudinal edges.

DE2256822 A1 discloses an expansion anchor, in which a rotation lock is provided between the expansion sleeve and the anchor bolt. This rotation lock might be formed by a groove extending into the expansion body of the bolt, and a corresponding protrusion, which protrudes from the expansion sleeve. In one embodiment of DE2256822 A1, the groove extends axially all along the expansion body and the protrusion extends axially all along the expansion sleeve. In another embodiment, the protrusion is shorter and offset from the expansion sleeve tip towards the rear end of the expansion sleeve.

WO12126700 A1 describes expansion anchors having webs on their expansion bodies, which webs can act upon the inside of the expansion sleeves of the anchors.

EP 0515916 A2 and DE3411285 A1 describe fasteners. In both cases, sleeves interlock with inner bolts via toothings.

SUMMARY OF THE INVENTION

It is an object of the present invention to provide an expansion anchor that has particularly high performance, whilst being easy to manufacture.

An inventive anchor is characterized in that the expansion body has at least one expansion sleeve abutment wall facing the expansion sleeve.

A first basic idea of the present invention may be seen in providing the expansion body with at least one expansion sleeve abutment wall, which expansion sleeve abutment wall faces the expansion sleeve before installation of the anchor, so that the expansion sleeve can hit the expansion sleeve abutment wall when the expansion body moves along the expansion sleeve during expansion of the expansion sleeve, when the anchor is installed. It has been unexpectedly discovered that this can significantly improve anchor performance. The following mechanism can explain the observed improvement: When the tip of the expansion sleeve touches the expansion sleeve abutment wall, a kind of temporary form fit can be generated between the expansion sleeve and the expansion body. This form fit can increase the resistance against pull-out of the expansion body out of the expansion sleeve, but it can do so advantageously without significant additional expansion of the expansion sleeve, i.e. without increasing the expansion force significantly. Due to the low expansion force, the substrate that surrounds the anchor, e.g. concrete, will not be overstressed, whereas the pullout loads remarkably increase. Thus, due to the interlock between expansion sleeve abutment wall and expansion sleeve, concrete capacity can increase significantly above the level of standard expansion anchors. Moreover, since the interlock between expansion sleeve abutment wall and expansion sleeve can reduce relative movement between expansion sleeve and expansion body plus anchor bolt, the total anchor displacement behavior, in particular in cyclic load cracked concrete conditions can also be improved.

The anchor bolt is an elongate body. The expansion body and the anchor bolt are, in particular, connected to transfer tensile forces. The expansion body can for example be threaded to the anchor bolt, in particular if the expansion anchor is a so-called sleeve-type expansion anchor. The expansion body can also be tightly fixed to the anchor bolt, in particular if the expansion anchor is a so-called stud-type expansion anchor. It is particularly preferred in case of a stud-type expansion anchor that the expansion body and the anchor bolt are integral, i.e. that they form one piece. If the expansion anchor is a so-called stud-type expansion anchor, the anchor bolt is preferably provided with a forwardly-facing shoulder for expansion sleeve abutment and for advancing the expansion sleeve into the borehole. The expansion body is a part of the expansion anchor.

The expansions sleeve surrounds the anchor bolt, in particular around the longitudinal axis. Preferably, the expansion sleeve is a single piece. However, it could also consist of several individual segments, which are for example held in a bolt-surrounding arrangement by means of a rubber band or by snap-on mechanisms.

Preferably, the anchor bolt, the expansion sleeve and/or the expansion body are each steel parts. They can for example comprise carbon steel or stainless steel.

The anchor bolt can have, in a rear region of the anchor bolt, a tension-introducing structure. The tension-introducing structure is for introducing tensile force into the anchor bolt. The tension-introducing structure can for example be a thread, in particular an outer thread, provided on the anchor bolt. The tension-introducing structure can for example also be a head, that forms a maximum cross-section, or a bayonet-type lock.

The converging zone of the expansion body serves to expand the expansion sleeve when the expansion sleeve is moved forward with respect to the expansion body, in particular to expand the expansion sleeve radially with respect to the longitudinal axis. In the converging zone, the expansion body converges, on its lateral surface, towards the rear of the anchor bolt and/or towards the tension-introducing structure, wherein the focus of convergence can preferably be the longitudinal axis. This in particular implies that the radial distance of the lateral surface of the expansion body from the longitudinal axis becomes smaller towards the rear of the expansion body. The expansion body can have additional zones, for example a preferably cylindrical transition zone and/or a tip zone. The converging zone can for example be conical, or can have a more complex, for example a convex or concave shape. In particular, the converging zone forms a wedge for the expansion sleeve.

The expansion sleeve abutment wall is for creating an interlock between the expansion body and the expansion sleeve. The expansion sleeve abutment wall is so arranged that the expansion sleeve can hit the expansion sleeve abutment wall, i.e. that the expansion sleeve can abut on the expansion sleeve abutment wall, when the expansion sleeve is axially displaced relative to the expansion body in the forwards direction, i.e. towards the front end of the expansion body and/or the anchor bolt, in particular by drawing-in the expansion body into the expansion sleeve in the rearwards direction. Thus, the expansion sleeve abutment wall axially faces the expansion sleeve, or, in other words, the expansion sleeve abutment wall faces the expansion sleeve in a direction parallel to the longitudinal axis. Preferably, the expansion sleeve abutment wall faces, in particular axially faces, the tip of the expansion sleeve and/or serves for abutment of the tip of the expansion sleeve, and can therefore be named expansion sleeve tip abutment wall. The tip of the expansion sleeve can be understood to be the front end of the expansion sleeve, i.e. the end pointing in the forwards direction. The expansion sleeve abutment wall is arranged vis-à-vis, in particularly axially vis-à-vis, the expansion sleeve, and particularly the tip of the expansion sleeve. In particularly, the expansion sleeve abutment wall faces, in particular axially faces, the expansion sleeve, in particular the expansion sleeve tip, in a state before the expansion sleeve is expanded by the expansion body, i.e. in the pre-installation state of the anchor, before the anchor is installed. In particular, the expansion sleeve abutment wall faces towards the rear of the anchor. The inventive anchor is so configured that the expansion sleeve, in particular with its tip, can hit the at least one expansion sleeve abutment wall during axial displacement of the expansion body relative to the expansion sleeve in the rearwards direction and/or during radial expansion of the expansion sleeve by the expansion body. Thus the at least one expansion sleeve abutment wall is suitable and/or configured for being abutted on by the expansion sleeve, in particular axially and/or by the tip of the expansion sleeve. In particular, the at least one expansion sleeve abutment wall is suitable and/or configured for being abutted on, in particular axially abutted on, by a section, in particular a front-end section, of the expansion sleeve, which section is curved around the longitudinal axis and/or designated to be radially displaced by the expansion body.

In particular, the expansion sleeve abutment wall projects radially on the expansion body and/or a step structure is formed at the expansion sleeve abutment wall, wherein the expansion sleeve abutment wall forms the riser of the respective step structure. The expansion sleeve abutment wall is arranged on the lateral surface of the expansion body, i.e. on the side of the expansion body.

The at least one expansion sleeve abutment wall might be straight in side view of the anchor bolt, permitting a simple structural design. However, the at least one expansion sleeve abutment wall may also be curved in side view of the anchor bolt, or it may, in side view of the anchor bolt, consist of several wall segments, for example straight wall segments, that are connected in an angled relationship to give a single expansion sleeve abutment wall. In particular, the at least one expansion sleeve abutment wall may form a concavity in side view of the anchor bolt, which might be advantageous from a manufacturing point of view. The radial height of the expansion sleeve abutment wall relative to its wall base can be constant, but might also vary.

Where the term "longitudinal axis" is used, this should, in particular, refer to the longitudinal axis of the anchor bolt, which is often also the longitudinal axis of the anchor. In accordance with the usual definition, the "longitudinal axis" can in particular be the axis that runs in the longitudinal direction, i.e. in the long direction of the elongate anchor bolt. Where the terms "radially", "axially" or "circumferentially" are used, this is should in particular be understood with respect to the longitudinal axis of the anchor bolt.

As explained in more detail above, the axial interlock between the expansion sleeve and the expansion body, generated by the at least one expansion sleeve abutment wall, can advantageously improve anchor performance. In addition to this, it was unexpectedly discovered that it is particularly advantageous when the form-fit interlock between the expansion sleeve and the expansion body generated by the at least one expansion sleeve abutment wall is significant, but not too strong. In other words, it is advantageous when the expansion sleeve abutment wall only "brakes" the expansion sleeve, without completely stopping it, i.e. when the expansion sleeve abutment wall can be surmounted by the expansion sleeve, on purpose and in particular without destroying the anchor. In particular, it was discovered that a complete stop of the expansion sleeve could lead to pull-out type of failure at high loads, which is an often undesired, premature pattern. This could be explained by a change of anchor characteristics from expansion-type to frictional-type when a hard stopping expansion sleeve abutment wall is hit by the expansion sleeve. In contrast, if the expansion sleeve abutment wall is designed to be surmounted by the expansion sleeve, the anchor characteristics can, at least partly, revert to expansion-type at high loads, which allows to activate expansion reserves at the expansion sleeve so that maximum load capacity can be further increased, preferably up to concrete cone failure. Thus, having the expansion sleeve abutment wall surmountable by the expansion sleeve can create a particularly long and smooth force-displacement characteristic of the anchor.

In view of the above, it is particularly advantageous if the at least one expansion sleeve abutment wall is designed for surmountably obstructing the expansion sleeve, in particularly for surmountably obstructing axial movement of the expansion sleeve. "Obstructing" implies here that an interlock can be created, "surmountably" that the interlock can be, on purpose, overcome, in particular at high loads. Such a surmountably obstruction can for example be created by having the expansion sleeve tip or/and the expansion sleeve abutment wall slanted along the axial direction, so that the expansion sleeve abutting on the expansion sleeve abutment wall is pushed radially outwards at high axial loads by a wedge effect, until the expansion sleeve can axially surmount the expansion sleeve abutment wall.

It is particularly advantageous if the least one expansion sleeve abutment wall tapers towards the rear of the anchor bolt. Thus, preferably, the expansion sleeve abutment wall is, at least in total, non-perpendicular to the longitudinal axis. Rather, the radius of the expansion body gradual decreases towards the rear of the anchor bolt at the expansion sleeve abutment wall. This allows creating a surmountable obstruction in a particularly reliable and easy-to-manufacture way. Preferably, the maximum slope $\alpha_{max}$ of the at least one expansion sleeve abutment wall, measured with respect to the longitudinal axis of the anchor bolt, is smaller than 80° or 70°, which means that no point of the expansion sleeve abutment wall has larger slope. It has been observed that at higher angles, the interlock might be too tight for certain situations. In accordance with usual definition, the slope measured with respect to the longitudinal axis can in particular be understood to be the angle between a tangent line at a point of the wall and the longitudinal axis, measure in a longitudinal plane, i.e. in a plane that contains the longitudinal axis.

Also, preferably, the maximum slope $\alpha_{max}$ of the at least one expansion sleeve abutment wall, measured with respect to the longitudinal axis of the anchor bolt, is greater than 30°. Having this lower boundary for the slope ensures particularly reliable interlock and can maximize capacity in a particularly simple way.

In another advantageous embodiment, the at least one expansion sleeve abutment wall has a maximum radial height $h_{60}$, i.e. a greatest height measured radially with respect to the longitudinal axis, from abutment wall base to abutment wall top, of at least 0.3 mm. This lower boundary allows a particular reliable engagement of the expansion sleeve at the expansion sleeve abutment wall with expansion sleeve types usually used for expansion anchors. Where the height of the at least one expansion sleeve abutment wall is constant, its maximum height is this constant height.

Preferably, the at least one expansion sleeve abutment wall is located at a distance $d_{60}$, in particular axial distance $d_{60}$, of at least 0.5*L1, preferably of at least 0.8*L1, from the rear end of the converging zone, wherein L1 is the length, in particular axial length, of the converging zone. Thus, the at least one expansion sleeve abutment wall is preferably located relatively far forward on the expansion body, so that the interlock with the expansion sleeve is only then generated when the expansion sleeve is already safely anchored. Therefore, premature pull-out can be efficiently avoided and concrete usage can be improved.

The expansion body can have, located in front of the converging zone, a transition zone. In such a transition zone, the convergence of the expansion body is at least less steep as compared with the converging zone, or the convergence can be completely absent. Such a transition zone can prevent over-expanding the expansion sleeve and over-stressing the surrounding substrate at high loads. If convergence is completely absent, the transition zone can have a cylindrical lateral surface, wherein cylindrical is to be understood in a broad definition, in which the cylinder base can be, but does not necessarily has to be circular.

If a transition zone is provided, the at least one expansion sleeve abutment wall is preferably located within the transition zone. This can result in a particularly well-coordinated activation of the expansion sleeve abutment wall and therefore particularly good load characteristics. In particular, the expansion sleeve abutment wall will in this case not be engaged by the expansion sleeve before a late expansion phase, in which the expansion sleeve is already safely anchored and increase of pressure on the substrate is relatively low. In this phase, the contribution of the interlock can be particularly efficient. Thus, concrete usage can be further improved.

The at least one expansion sleeve abutment wall can for example be located on a protrusion that radially projects from the expansion body. However, according to another preferred finding of the invention, the expansion body can be provided, in particular on its lateral surface, with at least one abutment wall recess, wherein the at least one abutment wall recess is limited, in particular at its front end, by the at least one expansion sleeve abutment wall. Thus, the expansion sleeve abutment wall forms the front-end wall of a recess. This can have a number of advantages: a) a recess can be particularly easy to manufacture, b) a wall formed at the end of a recess, i.e. an at least partly sunken wall, can be particularly robust, c) an at least partly sunken wall is less prone to undesired interference with the expansion mechanism or with the hole wall, and d) the recess can have additional preferable functions, amongst others substrate stress relieve. In particular, it has been found that if the recess is so designed that the expansion sleeve enters the recess upon being moved forwards relative to the expansion body, in particular by bending-in, pressure or, in particular, pressure-spikes on the substrate can be reduced, as will be explained in more detail below. Since the expansion sleeve abutment wall is located at the end of the recess, this pressure relief is "automatically" coordinated with the activation of the expansion sleeve abutment wall, which can further improve performance without much effort. Thus, it is particularly preferred if the anchor is so configured that the abutment wall recess receives a section of the expansion sleeve, in particular when the expansion sleeve is moved forwards relatively to the expansion body, i.e. when the expansion body is moved rearwards relatively to the expansion sleeve, and/or when the expansion sleeve is expanded by the expansion body, in particular by bending-in. Since the size of the recess is finite, only a part of the expansion sleeve gets into to the recess, whereas the other part of the expansion sleeve expands fully along the expansion body surface. Thus, concrete stress is reduced without significantly reducing expansion rate.

In particular, the at least one abutment wall recess extends radially into the expansion body. The at least one abutment wall recess is preferably at least partly located in the converging zone of the expansion body.

The expansion sleeve can have at least one slit, originating from the front end of the expansion sleeve. The slit can be due to manufacturing reasons, in particular if the expansion sleeve is manufactured by rolling a sheet material around the anchor bolt. Alternatively or additionally, the at least one slit can be provided for assisting expansion of the expansion sleeve. Preferably, the expansion sleeve has a plurality of slits originating from the front end of the expansion sleeve, and the expansion sleeve has fingers between neighboring slits.

It was discovered that a slit originating from the front end of the expansion sleeve can be the cause of particular substrate stress, since it forms a strong discontinuity that can, as such, potentially generate pressure spikes. Particularly in view of this, it is preferred that the at least one slit is located in a position where it at least partly overlaps the at least one abutment wall recess or can at least be brought into this position by rotating the expansion sleeve around to the anchor bolt, in particular without destroying the anchor. In such an overlapping position, the vicinity of the slit can engage into the abutment wall recess. It was found that this can significantly reduce the undesired pressure spikes. The overlap is in particular meant to be a radial overlap. Bringing the slit into an overlapping position was found to be often very easy to achieve: A side edge of the recess was found to automatically catch even a freely-rotating expansion sleeve at the slit during installation torqueing, thereby creating a rotational lock at the correct overlapping position.

If there is a plurality of abutment wall recesses and a plurality of slits originating from the front end of the expansion sleeve, it is particularly preferred, for the same reason, if all the slits are each located in a position where they at least partly overlap at least one of the abutment wall recesses or can at least be brought into this position by rotating the expansion sleeve around to the anchor bolt. Preferably, the number of abutment wall recesses equals the number of slits originating from the front end of the expansion sleeve, which allows tension relief at all slits and a particularly simple design.

Preferably, the expansion body has an arcuate cross-section adjacent to the at least one abutment wall recess. This can allow a particular uniform loading of the substrate, and can also support the above-mentioned rotational alignment of the slit. In accordance with the usual definition, a cross section is meant to be a section perpendicular to the longitudinal axis here.

It is particularly advantageous if the at least one expansion sleeve abutment wall has a maximum angular width $\theta_{max}$ that is greater than 50°, preferably greater than 60°, particularly preferable of about 70°. In other words, the at least one expansion sleeve abutment wall spans more than 50°, preferably more than 60°, particularly preferable of about 70° of the expansion body. In particular, the maximum angular width is measured at the longitudinal axis of the anchor bolt and/or in a plane perpendicular to the longitudinal axis of the anchor bolt. Preferably, the at least one expansion sleeve abutment wall is axially projected on this plane and the angular width, measured at the longitudinal axis of the anchor bolt, of this projection is taken as maximum angular width of the at least one expansion sleeve abutment wall. Thus, the expansion sleeve abutment wall is relatively broad, which can provide particularly good interlocking with the expansion sleeve, and, if the expansion sleeve abutment wall is provided at an abutment wall recess, this recess will usually have similar size, permitting reliable engagement, in particular bending-in, of the expansion sleeve into the recess, with the stress relief advantages resulting therefrom explained in detail above.

It is also advantageous if the at least one expansion sleeve abutment wall has a maximum angular width $\theta_{max}$ that is smaller than 90°, preferably smaller than 80°. The maximum angular width can be measured as described above. According to this embodiment, the expansion sleeve abutment wall is not too broad. This allows providing axially free sleeve regions, i.e. areas that have no expansion sleeve abutment wall axially in front of them, in a particularly easy way. Axially free sleeve regions can advantageously soften the interlock generated at the expansion sleeve abutment wall and/or they can allow a mixed expansion mechanism, which allows the system to adjust to particular load situations in a particularly easy and efficient way.

It is particularly preferred if the expansion body has a plurality of expansion sleeve abutment walls, in particular minimum 2 or minimum 3 expansion sleeve abutment walls. Having a plurality of expansion sleeve abutment walls can provide for a particularly uniform load distribution and therefore, whilst being easy to manufacture, for a particularly reliable interlock of the expansion sleeve. Moreover, it can avoid peak loads at the anchor and/or the surrounding concrete, thereby further improving performance. Moreover, it can facilitate the design of advantageous axially free sleeve regions, which can further improve performance at low costs. The individual expansion sleeve abutment walls are, in particular, separate and/or distinguishable from another.

In this text, reference is repeatedly made to the properties of "at least one expansion sleeve abutment wall". If, according to the invention, there is provided a plurality of expansion sleeve abutment walls, then at least one of the plurality of expansion sleeve abutment walls can have these properties, or all of the plurality of expansion sleeve abutment walls can have these properties, unless explicitly stated otherwise.

It is particularly preferred that the expansion sleeve abutment walls are arranged abreast, i.e. that they overlap in the axial direction. Preferably, there is at least on plane perpendicular to the longitudinal axis that intersects all expansion sleeve abutment walls. This allows for a particularly well-coordinated and therefore efficient interlock with usual sleeve structures.

According to a preferred embodiment, the expansion sleeve abutment walls span, in total, $\theta_{total}$ minimum 120°, preferably minimum 140° or, particularly preferably, minimum 160° of the expansion body. In other words, when the expansion sleeve abutment walls are all axially projected (i.e. projected using rays that run parallel to the longitudinal axis) on a plane perpendicular to the longitudinal axis, and the total angle covered by the projections of these walls in this plane is determined, this total angle is minimum 120°, preferably minimum 140° or, particularly preferably, minimum 160°. Thus, the expansion sleeve abutment walls are relatively broad in total, which provides for a particularly effective interlock.

According to another preferred embodiment, the expansion sleeve abutment walls span, in total, $\theta_{total}$ maximum 250° or maximum 280° of the expansion body. In other words, when the expansion sleeve abutment walls are all axially projected (i.e. projected using rays that run parallel to the longitudinal axis) on a plane perpendicular to the longitudinal axis, and the total angle covered by the projections of these walls in this plane is determined, this total angle is maximum 280°, preferable maximum 250°. This leaves significant axially free sleeve regions that have no expansion sleeve abutment wall in front of them, which can efficiently allow the system to adjust to particular load situations, as explained above.

It is particularly advantageous if the expansion body has maximum 8, preferably maximum 6, particularly preferable maximum 4, expansion sleeve abutment walls. Thus, there is relatively few expansion sleeve abutment walls and, if present, also relatively few abutment wall recesses. This allows to design the respective expansion sleeve abutment walls and, if present, the abutment wall recesses particularly effective in a particularly easy way. In particular, since there are only few elements, they can be made relatively broad without requiring complex designs. Broad expansion sleeve abutment walls, in turn, allow effective interlock and broad abutment wall recesses allow effective expansion sleeve engagement, resulting in effective stress relief and/or rotational interlock.

As already mentioned before, the individual expansion sleeve abutment walls may be straight, but also curved or segmented in side view of the anchor bolt. In the latter case, the individual sleeve abutment walls may, in side view of the anchor bolt, each consist of several wall segments, e.g. straight wall segments, that are connected in an angled relationship to give a common expansion sleeve abutment wall in each case.

In addition to the at least one expansion sleeve abutment wall, the expansion body might be provided with additional walls, e.g. recess side walls, which additional walls do not axially face the expansion sleeve and/or which additional walls are not suitable for expansion sleeve abutment upon axial displacement of the expansion sleeve, and which therefore cannot be termed expansion sleeve abutment walls.

If there is more than one expansion sleeve abutment wall, it is preferable that the expansion body is provided, in particular on its lateral surface, with a plurality of abutment wall recesses, wherein each abutment wall recess is limited, in particular at its respective front end, by one of the expansion sleeve abutment walls. This allows to achieve the advantages described above in context with a single recess in a multi-wall setup, wherein the provision of several recesses can increase their performance and ease of use. For example, a plurality of recesses can allow early engagement of an individual slit or simultaneous engagement of several slits of the expansion sleeve.

When there is a plurality of abutment wall recesses, it is advantageous if the plurality of expansion sleeve abutment walls cover 20% to 70%, preferably 40% to 45%, of the lateral surface of the expansion body, in particular of the lateral surface of the converging zone, or, where a transition zone is present, of the lateral surface of the converging zone plus transition zone. This allows the recesses to be particularly effective.

Preferentially, the expansion sleeve abutment walls are arranged in a symmetric manner, the expansion sleeve abutment walls are arranged equidistantly around the expansion body, and/or the expansion sleeve abutment walls all have equal widths, all within usual manufacturing tolerances. Such symmetric setups can improve load balance, and can therefore further improve performance.

It is particularly preferred if the maximum thickness $t_{30}$ of the expansion sleeve is between 0.75 mm and 3.5 mm. This allows particularly good interlock with the expansion sleeve abutment wall and/or engagement with the abutment wall recess. In particular, thickness of the expansion sleeve can be measured in the radial direction, in accordance with usual definition.

Preferentially, the converging zone has an apex angle $\beta$ between 10° and 40, particularly between 26° and 40°. If the apex angle $\beta$ is larger, there is an increased probability of the effect of the steep expansion sleeve abutment wall being masked by the already steep converging zone. If it is smaller, substrate loading would be high, even when there is interlock at the expansion sleeve abutment wall.

Preferably, the maximum diameter of the anchor bolt and/or the expansion zone is less than 30 mm or 25 mm. The invention can be particularly useful for relatively small anchors.

The invention also relates to a method for using, in particular for installing, an inventive expansion anchor, in which the expansion sleeve is moved forwards relative to the expansion body, in particular to expand the expansion sleeve, wherein the expansion sleeve hits the at least one expansion sleeve abutment wall. In particular, the invention also relates to a method for using, in particular for installing, an inventive expansion anchor, in which the anchor is inserted into a hole, and the expansion sleeve is, with the anchor located in the hole, in particular with at least the tip of the expansion sleeve located in the hole, moved forwards relative to the expansion body, wherein the expansion sleeve hits the at least one expansion sleeve abutment wall. Accordingly, the anchor is used and/or installed as intended. Moving the expansion sleeve forwards relative to the expansion body, i.e. moving the expansion body rearwards relative to the expansion sleeve, can preferably be achieved by pulling the anchor bolt, with the expansion body attached, out of the hole or/and by moving the expansion body rearwards relative to the anchor bolt. It could, in principle, also be achieved by pushing the expansion sleeve forwards over an expansion body that is axially stationary within the hole.

Preferably, the expansion sleeve is moved forwards relative to the expansion body, wherein the expansion sleeve hits the at least one expansion sleeve abutment wall and subsequently overcomes the at least one expansion sleeve abutment wall. Thus, the expansion sleeve abutment wall is axially surmounted, as advantageously intended at high loads.

Moreover, it is advantageous if the expansion sleeve is moved forwards relative to the expansion body, wherein a region of the expansion sleeve is inserted into at least one abutment wall recess. This can for example reduce concrete stress or generate a rotational lock, as described in more detail above.

Features which are described here in context with the anchor can also be used for the method for using the anchor, and features that are described here in context with the method for using the anchor can also be used for the anchor itself.

BRIEF DESCRIPTION OF THE DRAWINGS

The invention is explained in greater detail below with reference to preferred exemplary embodiments, which are depicted schematically in the accompanying drawing, where individual features of the exemplary embodiments presented below can be implemented either individually or in any combination within the scope of the present invention.

FIG. 4 shows the anchor in side view,

FIG. 5 in cut-out detail side view and

FIGS. 6 and 7 in cut-out sectional view, similar to FIG. 2.

DETAILED DESCRIPTION

The figures show an embodiment of an inventive expansion anchor. The anchor comprises an elongate anchor bolt 10 defining a longitudinal axis 99, an expansion sleeve 30, which surrounds the anchor bolt 10, and an expansion body 12 for the expansion sleeve 30 provided on the anchor bolt 10, namely in the vicinity of the front end of the anchor bolt 10.

Figure 1:
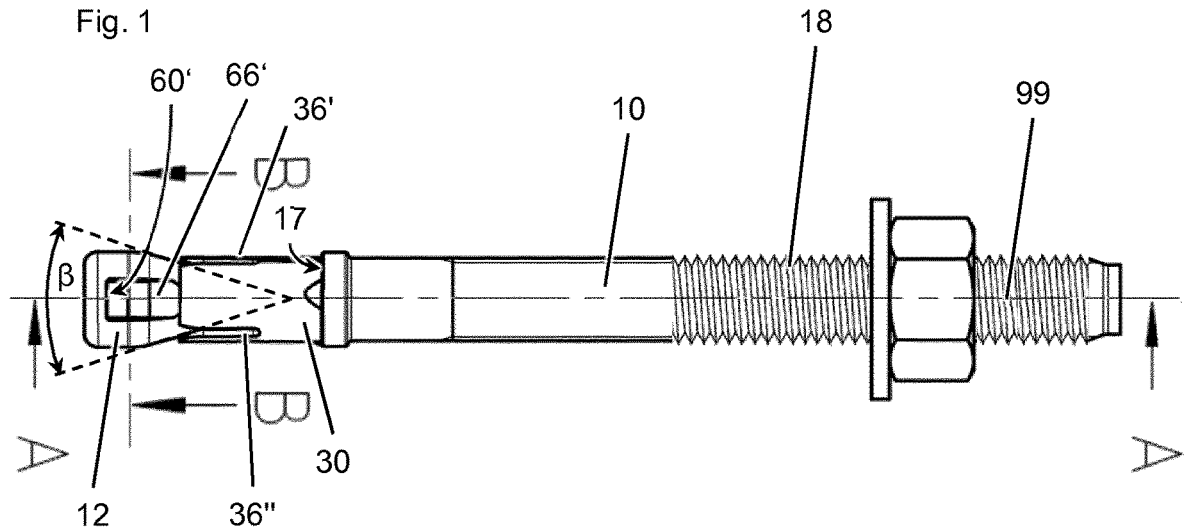
FIG. 1: a side view of an inventive expansion anchor.
Figure 2:
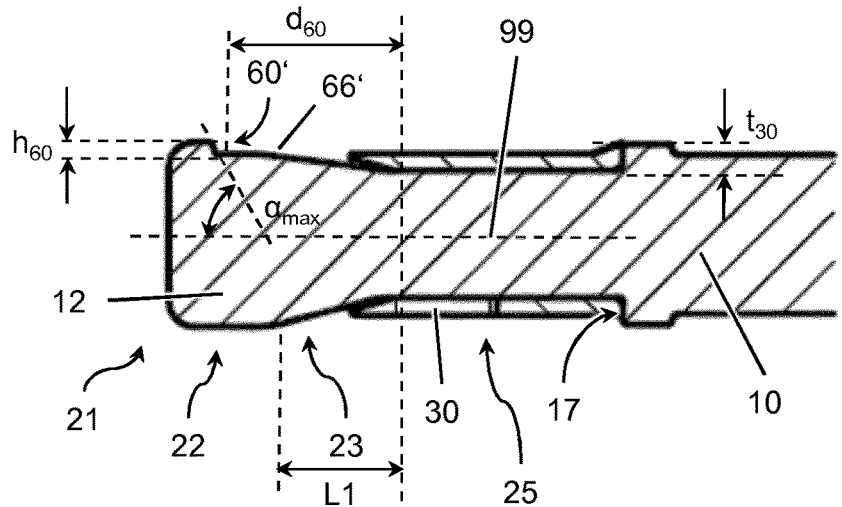
FIG. 2: a cut-out of the front region of the anchor of FIG. 1 in sectional view A-A according to FIG. 1.

As shown in particular in FIG. 2, the expansion body 12 has a converging zone 23 designed for radially expanding the expansion sleeve 30 when the expansion body 12 is drawn into the expansion sleeve 30 in the rearwards direction, i.e. when the expansion sleeve 30 is moved forwards relative to the expansion body 12 onto the expansion body 12. For this purpose, the lateral surface of the expansion body 12 converges towards the rear of the anchor, i.e. it converges towards the expansion sleeve 30, at least before the anchor is installed. In the present example, the expansion body 12 lateral surface is conical in the converging zone 23, with a focus of convergence on the longitudinal axis 99 and with apex angle $\beta$ shown in FIG. 1. However, this is merely an example and other converging designs are also possible.

In the present example, the expansion body 12 also has a transition zone 22, which is located forwards of and adjacent to the converging zone 23, and a tip zone 21, which is located forwards of and adjacent to the transition zone 22. In the transition zone 22, the rearward convergence is smaller as compared to the converging zone 23 or the rearward convergence is even zero, but preferably not reverse, i.e. it is not a forward convergence. In the present example, convergence is absent, i.e. zero, in the converging zone 23 and the expansion body 12 has a cylindrical lateral surface in the converging zone 23, in particular cylindrical with a circular base. In the tip zone 21, the lateral surface of the expansion body 12 converges towards the front end of the anchor.

The anchor bolt 10 has a neck 25, which is located adjacent to and rearwards of the expansion body 12. The expansion sleeve 30 at least partly surrounds this neck 25, at least before installation the anchor. At the neck 25, the diameter of the anchor bolt 10 can be minimal.

In the present embodiment, the anchor is of the stud type. The bolt 10 has, at the rearward end of the neck 25, a shoulder 17 facing forwards for axially engaging the expansion sleeve 30 and for advancing the expansion sleeve 30 forwards. In the present case, the expansion body 12 is, by way of example, integral with the anchor bolt 10.

In a rear region of the anchor bolt 10, the anchor bolt 10 is provided with a tension-introducing structure 18, here in the form of an outer thread provided on the anchor bolt 10.

The expansion sleeve 30 is provided with a plurality of slits 36', 36", which originate from the front end of the expansion sleeve 30 and extend towards the rear end of the expansion sleeve 30. The slits 36', 36" facilitate radial expansion of the expansion sleeve 30. The expansion sleeve 30 has a maximum radial thickness $t_{30}$ shown in FIG. 2.

On the lateral surface of the expansion body 12 is provided a plurality of abutment wall recesses 66', 66", 66''' (exemplarily three in the present case, but a different number can be also provided). These abutment wall recesses 66', 66", 66''' are radially accessible from the outside of the expansion body 12. By way of example, they each have a roughly rectangular contour when seen in side view. Other contours are possible, however.

Each of the abutment wall recesses 66 is terminated at its front end by an expansion sleeve abutment wall 60. As there are three abutment wall recesses 66', 66", 66''' in the present example, there are also three expansion sleeve abutment walls 60', 60", 60'''. Each of these expansion sleeve abutment walls 60', 60", 60''' faces the expansion sleeve 30, i.e. faces rearwardly, and forms a surmountable axial stop for the front end, i.e. for the tip, of the expansion sleeve 30, as will be described in more detail below.

Figure 3:
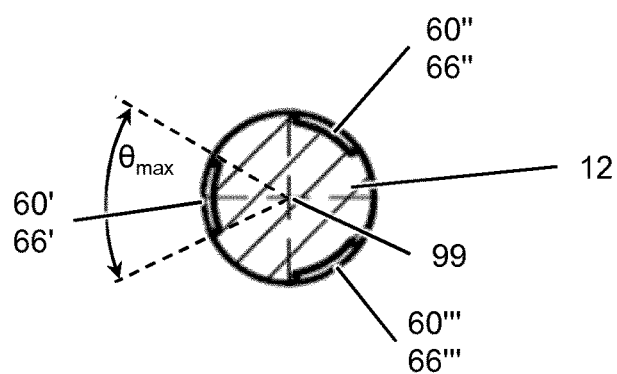
FIG. 3: a cross-sectional view B-B according to FIG. 1 of the anchor of FIGS. 1 and 2.

As shown in FIG. 2 and, by way of example, at expansion sleeve abutment wall 60', each of the expansion sleeve abutment walls 60', 60", 60''' has a radial height $h_{60}$ and a maximum slope $\alpha_{max}$, measured longitudinally with respect to the longitudinal axis 99. As shown in FIG. 3 and, by way of example, at expansion sleeve abutment wall 60', each of the expansion sleeve abutment walls 60', 60", 60''' has a maximum angular width $\theta_{max}$, in cross section and around the longitudinal axis 99. In total, all expansion sleeve abutment walls 60', 60", 60''' span a total angle $\theta_{total}$ around the longitudinal axis 99. The expansion sleeve abutment walls 60', 60", 60''' are abreast, located at the same position along the longitudinal axis 99, and do not overlap in the circumferential direction. Therefore, $\theta_{total}$ is here the sum of the maximum angular widths $\theta_{max}$ of all expansion sleeve abutment walls 60', 60", 60''', i.e. $\theta_{total} \tau \theta_{max}$.

The expansion sleeve abutment walls 60', 60", 60''' are all located in the transition zone 22. In particular, as shown in FIG. 2 and, by way of example, at expansion sleeve abutment wall 60', each of the expansion sleeve abutment walls 60', 60", 60''' is located at a distance $d_{60}$ from the axial rear end of the expansion body 12, i.e. from the rear end of the converging zone 23, which distance $d_{60}$ is greater than the axial length L1 of the converging zone 23.

A method for using the anchor is illustrated in FIGS. 4 to 7.

Figure 4:
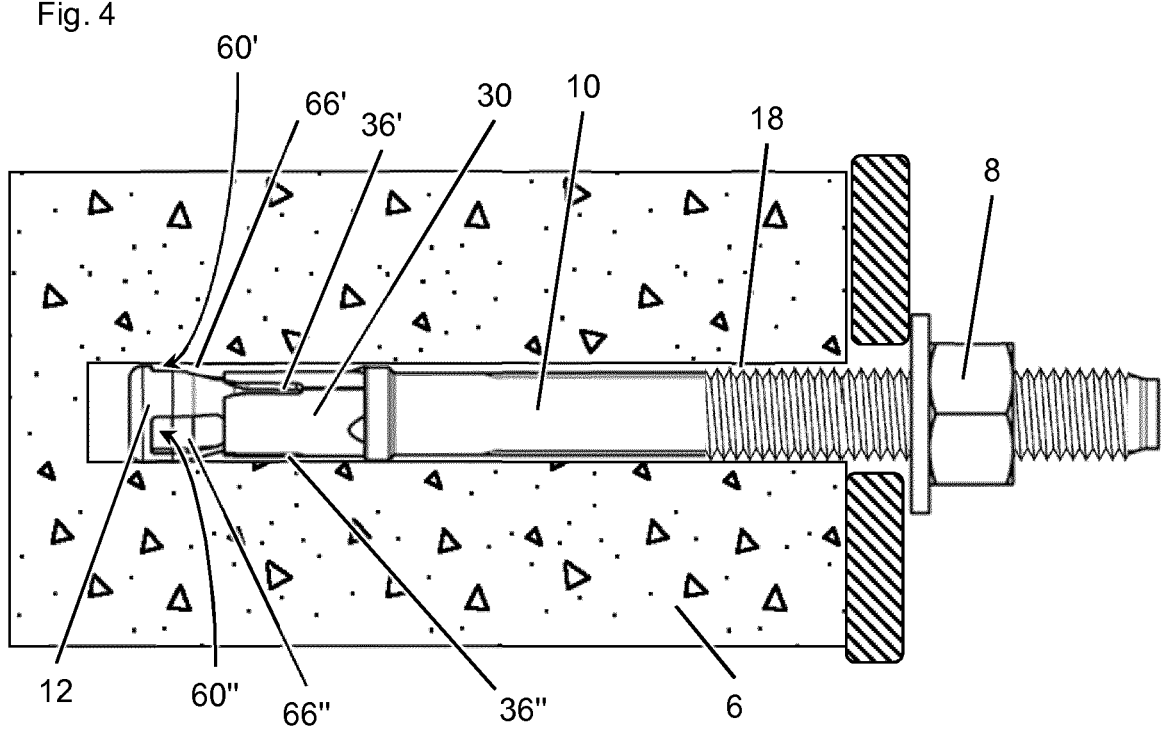
FIGS. 4 to 7: consecutive steps of a method for using the anchor of FIGS. 1 to 3 in a substrate, wherein, for the sake of clarity, the substrate is only shown in FIG. 4.

In a first step of the method, shown in FIG. 4, the anchor is introduced, front end first, into a hole in a substrate 6.

Figure 5:
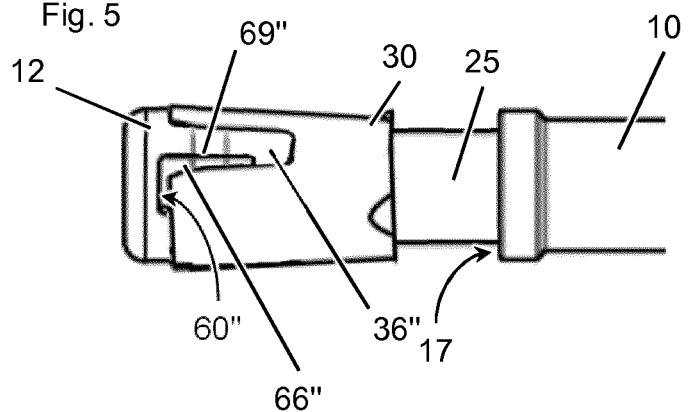
Figure 6:
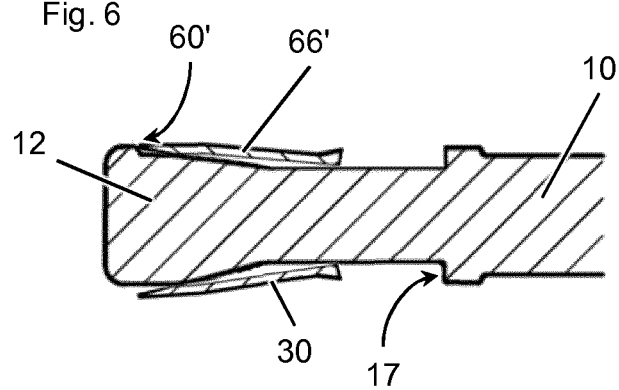
Figure 7:
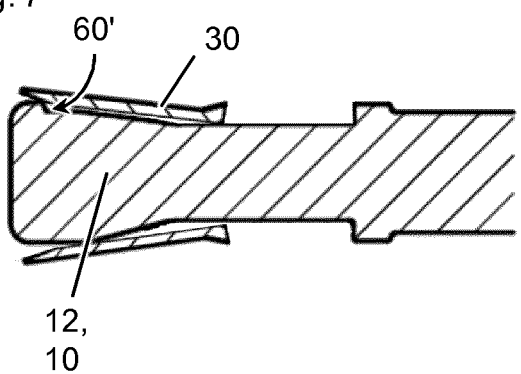

Subsequently, the expansion body 12 is drawn into the front-end region of the expansion sleeve 30, i.e. the expansion sleeve 30 is pushed forwards relatively to the expansion body 12 and over the expansion body 12. In the present embodiment, this is achieved by pulling the anchor bolt 10 together with the expansion body 12 rearwardly, in particular by tightening a nut 8 provided on the tension-introducing structure 18 of the anchor bolt 10. Since the substrate 6 exerts radial pressure on the expansion sleeve 30, the expansion sleeve 30 slightly bend radially into the abutment wall recesses 66', 66", 66m when the expansion body 12 is drawn into the front-end region of the expansion sleeve 30. FIGS. 5 to 7 show consecutive positions of the expansion sleeve 30 relative to the expansion body 12 during drawing-in of the expansion body 12.

At some stage, as shown in FIG. 6, the expansion sleeve 30 axially hits, with its tip in the bent-in regions, the expansion sleeve abutment walls 60', 60", 60'''. This results in a form-fit type axial interlock of the expansion sleeve 30 with the expansion body 12 at the expansion sleeve abutment walls 60', 60", 60'''. This interlock leads to a temporary change of the expansion mechanism and can result in increased pull-out resistance without excessive stress of the substrate 6.

The interface between the expansion sleeve abutment walls 60', 60", 60''' and the expansion sleeve 30 is so designed that the interlock can be overcome on purpose at high tensile loads, as shown in FIG. 7, leading to a return of the expansion mechanism, and potentially to particularly good resistance at high loads.

Tightening of the nut 8 might induce rotation of the expansion body 12 relative to the expansion sleeve 30 at the beginning of installation. But this rotation is soon stopped, namely when the edge of a slit engages a side wall of one of the abutment wall recesses 66', 66", 66m, e.g. when the edge of slit 36" engages side wall 69" of recess 66", as shown in FIG. 5.

What is claimed is:

1. An expansion anchor comprising:
   an anchor bolt;
   an expansion sleeve surrounding the anchor bolt; and
   an expansion body located in a front region of the anchor bolt, the expansion body having a converging zone for expanding the expansion sleeve, the expansion body having at least one expansion sleeve abutment wall facing the expansion sleeve in an axial direction,
   the expansion body having at least one abutment wall recess configured to receive a section of the expansion sleeve.

2. The expansion anchor as recited in claim 1 wherein the at least one expansion sleeve abutment wall is configured to surmountably obstruct the expansion sleeve.

3. The expansion anchor as recited in claim 1 wherein the least one expansion sleeve abutment wall tapers towards a rear of the anchor bolt.

4. The expansion anchor as recited in claim 1 wherein a maximum slope of the at least one expansion sleeve abutment wall, measured with respect to a longitudinal axis of the anchor bolt, is greater than 30° and smaller than 80°.

5. The expansion anchor as recited in claim 1 wherein the at least one expansion sleeve abutment wall has a maximum radial height of at least 0.3 mm.

6. The expansion anchor as recited in claim 1 wherein the at least one expansion sleeve abutment wall is located at a distance of at least 0.5*L1 from a rear end of the converging zone, wherein L1 is the length of the converging zone.

7. The expansion anchor as recited in claim 6 wherein the distance is at least 0.8*L1.

8. The expansion anchor as recited in claim 1 wherein the expansion body has, located in front of the converging zone, a transition zone, the at least one expansion sleeve abutment wall being located within the transition zone.

9. The expansion anchor as recited in claim 1 wherein the at least one abutment wall recess is limited by the at least one expansion sleeve abutment wall.

10. The expansion anchor as recited in claim 9 wherein the expansion sleeve has at least one slit, originating from a front end of the expansion sleeve, the at least one slit being located in a position where the at least one slit at least partly overlaps the at least one abutment wall recess or is configured to be bringable into a partly overlapping position by rotating the expansion sleeve around the anchor bolt.

11. The expansion anchor as recited in claim 9 wherein the expansion body has an arcuate cross-section adjacent to the at least one abutment wall recess.

12. The expansion anchor as recited in claim 1 wherein the at least one expansion sleeve abutment wall has a maximum angular width, measured at a longitudinal axis of the anchor bolt in a plane perpendicular to the longitudinal axis of the anchor bolt, that is greater than 50° and smaller than 90°.

13. The expansion anchor as recited in claim 12 wherein the maximum angular width is greater than 60° and smaller than 80°.

14. The expansion anchor as recited in claim 1 wherein at least one expansion sleeve abutment wall includes a plurality of expansion sleeve abutment walls.

15. The expansion anchor as recited in claim 1 wherein the expansion sleeve abutment walls are arranged abreast.

16. The expansion anchor as recited in claim 15 wherein that the expansion sleeve abutment walls span, in total, a minimum 120° and maximum 280° of the expansion body.

17. The expansion anchor as recited in claim 16 wherein that the expansion sleeve abutment walls span, in total, minimum 140° and a maximum 250° of the expansion body.

18. The expansion anchor as recited in claim 15 wherein the expansion body has maximum of 8 expansion sleeve abutment walls.

19. The expansion anchor as recited in claim 15 wherein the expansion body has maximum of 6 expansion sleeve abutment walls.

20. The expansion anchor as recited in claim 15 wherein the expansion body has maximum of 4 expansion sleeve abutment walls.

21. The expansion anchor as recited in claim 9 wherein at least one abutment wall includes a plurality of abutment wall recesses, wherein each abutment wall recess is limited by one of the at least one expansion sleeve abutment wall, wherein the plurality of abutment wall recesses cover 20% to 70% of a lateral surface of the expansion body.

22. The expansion anchor as recited in claim 21 wherein the plurality of abutment wall recesses cover 40% to 45% of the lateral surface of the expansion body.

23. The expansion anchor as recited in claim 1 wherein expansion sleeve abutment walls of the at least one expansion sleeve abutment walls are arranged in a symmetric manner, the expansion sleeve abutment walls are arranged equidistantly around the expansion body, or the expansion sleeve abutment walls all have equal widths.

24. The expansion anchor as recited in claim 1 wherein a maximum thickness of the expansion sleeve is between 0.75 mm and 3.5 mm, or the converging zone has an apex angle between 10° and 40°.

25. A method for using the expansion anchor as recited in claim 23, the method comprising:
moving the expansion sleeve forward relative to the expansion body so that the expansion sleeve hits the at least one expansion sleeve abutment wall.

26. The method as recited in claim 25 wherein moving further includes overcoming the at least one expansion sleeve abutment wall subsequent to the hitting.

27. The method as recited in claim 25 wherein as the expansion sleeve is moved forward relative to the expansion body, a region of the expansion sleeve is inserted into the at least one abutment wall recess.

28. The expansion anchor as recited in claim 1 wherein the expansion sleeve abutment walls are arranged abreast, located at the same position along the longitudinal axis, and do not overlap in the circumferential direction.

29. The expansion anchor as recited in claim 28 wherein the expansion sleeve abutment walls include at least three expansion sleeve abutment walls.

30. An expansion anchor comprising:
an anchor bolt;
an expansion sleeve surrounding the anchor bolt; and
an expansion body located in a front region of the anchor bolt, the expansion body having a converging zone for expanding the expansion sleeve, the expansion body having at least one expansion sleeve abutment wall facing the expansion sleeve in an axial direction and at least one abutment wall recess at least partially in between the at least one expansion sleeve abutment wall and the expansion sleeve prior to deployment of the expansion sleeve.

31. The expansion anchor as recited in claim 30 wherein the at least one abutment wall recess is at least partially axially in between the at least one expansion sleeve abutment wall and the expansion sleeve prior to deployment of the expansion sleeve.

32. The expansion anchor as recited in claim 30 wherein the at least one expansion sleeve abutment wall is configured to surmountably obstruct the expansion sleeve.

33. The expansion anchor as recited in claim 30 wherein the least one expansion sleeve abutment wall tapers towards a rear of the anchor bolt.

34. The expansion anchor as recited in claim 30 wherein a maximum slope of the at least one expansion sleeve abutment wall, measured with respect to a longitudinal axis of the anchor bolt, is greater than 30° and smaller than 80°.

35. The expansion anchor as recited in claim 30 wherein the at least one expansion sleeve abutment wall has a maximum radial height of at least 0.3 mm.

36. The expansion anchor as recited in claim 30 wherein the at least one expansion sleeve abutment wall is located at a distance of at least 0.5*L1 from a rear end of the converging zone, wherein L1 is the length of the converging zone.

37. The expansion anchor as recited in claim 36 wherein the distance is at least 0.8*L1.

38. The expansion anchor as recited in claim 30 wherein the expansion body has, located in front of the converging zone, a transition zone, the at least one expansion sleeve abutment wall being located within the transition zone.

39. The expansion anchor as recited in claim 30 wherein the at least one abutment wall recess is limited by the at least one expansion sleeve abutment wall.

40. The expansion anchor as recited in claim 30 wherein the at least one abutment wall recess is configured to receive a section of the expansion sleeve.

41. The expansion anchor as recited in claim 39 wherein the expansion sleeve has at least one slit, originating from a front end of the expansion sleeve, the at least one slit being located in a position where the at least one slit at least partly overlaps the at least one abutment wall recess or is configured to be bringable into a partly overlapping position by rotating the expansion sleeve around the anchor bolt.

42. The expansion anchor as recited in claim 39 wherein the expansion body has an arcuate cross-section adjacent to the at least one abutment wall recess.

43. The expansion anchor as recited in claim 30 wherein the at least one expansion sleeve abutment wall has a maximum angular width, measured at a longitudinal axis of the anchor bolt in a plane perpendicular to the longitudinal axis of the anchor bolt, that is greater than 50° and smaller than 90°.

44. The expansion anchor as recited in claim 43 wherein the maximum angular width is greater than 60° and smaller than 80°.

45. The expansion anchor as recited in claim 30 wherein at least one expansion sleeve abutment wall includes a plurality of expansion sleeve abutment walls.

46. The expansion anchor as recited in claim 30 wherein the expansion sleeve abutment walls are arranged abreast.

47. The expansion anchor as recited in claim 46 wherein that the expansion sleeve abutment walls span, in total, a minimum 120° and maximum 280° of the expansion body.

48. The expansion anchor as recited in claim 47 wherein that the expansion sleeve abutment walls span, in total, minimum 140° and a maximum 250° of the expansion body.

49. The expansion anchor as recited in claim 46 wherein the expansion body has maximum of 8 expansion sleeve abutment walls.

50. The expansion anchor as recited in claim 46 wherein the expansion body has maximum of 6 expansion sleeve abutment walls.

51. The expansion anchor as recited in claim 46 wherein the expansion body has maximum of 4 expansion sleeve abutment walls.

52. The expansion anchor as recited in claim 30 wherein at least one abutment wall includes a plurality of abutment wall recesses, wherein each abutment wall recess is limited by one of the at least one expansion sleeve abutment wall, wherein the plurality of abutment wall recesses cover 20% to 70% of a lateral surface of the expansion body.

53. The expansion anchor as recited in claim 52 wherein the plurality of abutment wall recesses cover 40% to 45% of the lateral surface of the expansion body.

54. The expansion anchor as recited in claim 30 wherein expansion sleeve abutment walls of the at least one expansion sleeve abutment walls are arranged in a symmetric manner, the expansion sleeve abutment walls are arranged equidistantly around the expansion body, or the expansion sleeve abutment walls all have equal widths.

55. The expansion anchor as recited in claim 30 wherein a maximum thickness of the expansion sleeve is between 0.75 mm and 3.5 mm, or the converging zone has an apex angle between 10° and 40°.

56. A method for using the expansion anchor as recited in claim 53, the method comprising:
moving the expansion sleeve forward relative to the expansion body so that the expansion sleeve hits the at least one expansion sleeve abutment wall.

57. The method as recited in claim 56 wherein moving further includes overcoming the at least one expansion sleeve abutment wall subsequent to the hitting.

58. The method as recited in claim 56 wherein as the expansion sleeve is moved forward relative to the expansion body, a region of the expansion sleeve is inserted into the at least one abutment wall recess.

59. The expansion anchor as recited in claim 30 wherein the expansion sleeve abutment walls are arranged abreast, located at the same position along the longitudinal axis, and do not overlap in the circumferential direction.

60. The expansion anchor as recited in claim 59 wherein the expansion sleeve abutment walls include at least three expansion sleeve abutment walls.

61. A method for using an expansion anchor having an anchor bolt; an expansion sleeve surrounding the anchor bolt; and an expansion body located in a front region of the anchor bolt, the expansion body having a converging zone for expanding the expansion sleeve, the expansion body having at least one expansion sleeve abutment wall facing the expansion sleeve in an axial direction, the method comprising:
moving the expansion sleeve forward relative to the expansion body so that the expansion sleeve hits the at least one expansion sleeve abutment wall and as the expansion sleeve is moved forward relative to the expansion body, a region of the expansion sleeve is inserted into at least one abutment wall recess.

* * * * *